United States Patent
Hibino

(10) Patent No.: US 7,310,297 B2
(45) Date of Patent: Dec. 18, 2007

(54) OPTICAL DISK DEVICE

(75) Inventor: Kiyoshi Hibino, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 646 days.

(21) Appl. No.: 10/951,772

(22) Filed: Sep. 29, 2004

(65) Prior Publication Data

US 2005/0068880 A1  Mar. 31, 2005

(30) Foreign Application Priority Data

Sep. 30, 2003  (JP) .............................. 2003-340998

(51) Int. Cl.
*G11B 7/00* (2006.01)
(52) U.S. Cl. .............................. 369/112.02; 369/44.23; 369/44.34
(58) Field of Classification Search ........... 369/112.02, 369/112.03, 112.12, 112.13, 44.34, 44.23, 369/44.35, 44.41, 44.27, 44.28, 44.29, 44.13, 369/53.22
See application file for complete search history.

(56) References Cited

U.S. PATENT DOCUMENTS 6,934,228 B2 * 8/2005 Shimano et al. ......... 369/44.35

FOREIGN PATENT DOCUMENTS

JP  2002-367197  12/2002

\* cited by examiner

*Primary Examiner*—Ali Neyzari
(74) *Attorney, Agent, or Firm*—Edwards Angell Palmer & Dodge LLP

(57) ABSTRACT

This invention provides an optical disk device comprising an optical pick-up being structured to irradiate light beams onto an optical disk through an objective lens unit, receive the light beams reflected from the optical disk by a two-divided light-receiving element, convert amounts of light received by each segment of the light-receiving element into electrical outputs, and detect differential signals between the electrical outputs, a spherical aberration adjustment device for changing spherical aberration of light emitted from the objective lens, a detection device for detecting control signals for the adjustment device to minimize asymmetry of the deterioration degree of the differential signal amplitude detected when a light beam is defocused at any desired position on the radius of the optical disk, and a memory device for storing the control signals corresponding to the positions on the radius. The optical disk device performs recording and reproducing by controlling the spherical aberration adjustment device based on the control signals for the positions on the radius stored in the memory device.

7 Claims, 13 Drawing Sheets

OPTICAL DISK DEVICE

The priority application Ser. No. 340998/2003 upon which this patent application is based is hereby incorporated by reference.

BACKGROUND OF THE INVENTION

1. Field of the Invention

The present invention relates to an optical disk device, particularly to an optical disk device to mitigate the influence of spherical aberration that results from individual differences of optical disks such as thickness variation in a cover layer.

2. Description of Prior Art

Storage density of an optical disk is limited mostly by the spot size of beam for recording and reproducing; $\lambda/NA$ ($\lambda$: wavelength, NA: numerical aperture of an objective lens). In order to increase the capacity of the optical disk, therefore, it is necessary to shorten the wavelength and increase the numerical aperture.

Short wavelength lasers such as blue-violet laser and objective lenses with large numerical aperture, e.g. NA=0.85, are adopted to obtain a minute spot. With an increase in NA, however, the quality of the spot is noticeably reduced because of spherical aberration that occurs when laser light enters the cover layer of the disk and comatic aberration that occurs with tilt variation of the disk.

In order to reduce the spherical aberration and the comatic aberration, an extremely thin cover layer of 0.1 mm in thickness is adopted for the optical disk.

If there are thickness variations in a cover layer or among the cover layers of disks, the spot formed by transmitting laser light through the cover layer shows that spherical aberration occurs. The occurrence of the spherical aberration makes the spot blurry and larger in diameter and reduces central light intensity of the spot. The larger spot cannot read the minute signals accurately. In a case of the optical disk on a principal that a recording is performed by an optical heat, a decrease in the central light intensity results in its temperature not reaching a predetermined value required for the recording, thus not possible to record. On the other hand, if an entire amount of light is increased in order to obtain the predetermined temperature, an area above the predetermined temperature expands, thus not possible to record minutely.

In view of the above-mentioned problems, Japanese unexamined patent publication No. 367197/2002 A and others have proposed optical disk devices, which can accurately and reliably detect spherical aberration that results from thickness variations of the disk and misalignment in the optical system, and correct the spherical aberration.

By referring to drawings, descriptions will be made on such an optical disk device. FIG. 17 is a block diagram showing a basic structure of a conventional optical disk device that corrects spherical aberration. Light from a semiconductor laser 101 is collimated by a collimator lens 102, passes through a beam splitter 103 and is focused on a recording layer of an optical disk 108 through a cover layer by two objective lenses 106 and 107 in two units. A first lens 106 of the two objective lenses in two units is mounted in a bidirectional actuator 104 and driven in the direction of the optical axis and in the direction of radius of the optical disk. A second lens 107 is mounted on an actuator 105 for correcting spherical aberration, which is driven together with the first lens. These actuators 104 and 105 change the distance between the two lenses to generate spherical aberrations corresponding to the distance.

The light reflected off the optical disk 108 is reflected by the beam splitter 103 and enters a light-splitting hologram 109. Light around the optical axis and light at the periphery of the hologram 109 (not shown) are split toward different directions and enter a photodetector 112 through a cylindrical lens 111 by a condenser lens 110.

The photodetector 112 includes a plurality of light-receiving regions, which individually detect the light and convert the detected light into photoelectric currents. The photoelectric currents are output as a respective voltage signal from a focus error signal detector (AF) circuit 113, a tracking error signal detector (TR) circuit 114, a spherical aberration signal detector (SA) circuit 115 and a reproduction signal detector (RF) circuit 116.

The focus error signal is fed back to the bidirectional actuator 104 as a driving signal to move the bidirectional actuator 104 in the focusing direction (optical axis direction) so that an optimal light spot is constantly formed on the optical disk. The tracking error signal is fed back to the bidirectional actuator 104 as a driving signal to move the bidirectional actuator 104 in the direction of radius of the disk. The spherical aberration signal is fed back to the actuator 105 to control the actuator 105 to compensate spherical aberration, which results from the thickness deviation of the cover layer of the optical disk 108 or the improper distance between the lenses. The reproduction signal detector circuit 116 performs a series of processes for producing signals stored on the optical disk, including current-voltage conversion, waveform equalization and binarization.

By the way, a method for detecting the spherical aberration has been proposed, in which the focus error signals are detected individually from inner light and outer light of a light flux collected on the photodetector to obtain a differential signal between them. However, the focus error signal may be deteriorated by interference of light on the photodetector, thus the range in which spherical aberration can be detected stably may become narrower. In the above-mentioned device, prior to being collected onto the photodetector 112, the light flux is split by the light-splitting hologram 109 into inner light and outer light. The split lights are converged onto the different light-receiving regions of the photodetector 112; each region calculates a focus error signal to obtain their difference, thereby obtaining the spherical aberration signal. Accordingly, the spherical aberration signal is detected more reliably.

In the optical disk device disclosed in Japanese unexamined patent publication 367197/2002, the spherical aberration signal can be detected reliably. However, the device requires some extra detecting components including the light-splitting hologram and the light-receiving element with a special splitting pattern to detect spherical aberration, resulting in an increase in complexity and cost of the device.

Additionally, a liquid crystal element for correcting spherical aberration has been proposed recently. The liquid crystal element is used in an optical pick-up in which an isolator is composed of a polarizing beam splitter and a quarter wavelength plate to reduce noise generated by light returning to the laser. Detection of the spherical aberration with the use of such an optical pick-up comprising no specialized elements but the liquid crystal element entails following difficulties.

Prior to the description of the difficulties, a brief description about the structure and functions of the isolator will be made, which is well-known technology.

In FIG. 2, light emitted from a laser diode 26 is vertical (p-wave) linearly polarized light to a polarizing beam splitter 30. The light enters the polarizing beam splitter 30. The polarizing beam splitter 30 splits the vertical (p-wave) component of light into spectrum of transmitted light and reflected light at a predetermined ratio such as 9:1, while splitting the horizontal (s-wave) component of light into a spectrum of transmitted light and reflected light at a predetermined ratio such as 0:10, for example. In this case, one-tenth of the incident light is reflected by the polarizing beam splitter 30 and enters a front monitor 32, while remaining light is transmitted through the polarizing beam splitter 30.

The transmitted linearly polarized light being incident to a quarter (¼) wavelength plate 36 via a liquid crystal element 35 for correcting spherical aberration is converted into circularly polarized light. The light entering an objective lens 40 is focused on a signal surface of a disk 1 and then reflected off. The reflected light retraces the approaching route and passes through the quarter wavelength plate 36. In the quarter wavelength plate 36, the circularly polarized light is converted into linearly polarized light in opposite phase to the incoming light. In other words, the light has horizontal plane (s-wave) to the polarizing beam splitter 30. The light again enters the polarizing beam splitter 30 through the liquid crystal element 35 for correcting spherical aberration and is reflected 100% by the splitter 30 without returning to the laser 26.

Secondly, brief descriptions will be made about the liquid crystal elements 35 for correcting spherical aberration as a premise of the invention. The element comprises a plurality of separated electrodes that are concentric circles. By applying voltages individually to the separated electrodes, the liquid crystal element 35 is changed in its refraction index and provides phase difference to the light passing therethrough, thereby the spherical aberration is corrected. Because the spherical aberration caused by the thickness variation of the cover layer appears in the shape of a doughnut, the electrodes of the liquid crystal element 35 takes shape of circular bands that are concentric each other, and produce aberration (phase difference) opposite in shape to the spherical aberration generated at the disk. As a result, the aberrations are compensated for each other; therefore, the spherical aberration of the beam spot formed on the disk is compensated.

Problems associated with the liquid crystal element win be then described. In order to use the liquid crystal element, a quarter wavelength plate must be disposed downstream of the liquid crystal element on the approaching route. In this structure, reflected light from the disk passes through the quarter wavelength plate prior to the liquid crystal element on the returning route. The plane of the polarized light that enters the liquid crystal element on the returning route is perpendicular to the plane of the polarized light entering the element on the approaching route. Thus the liquid crystal element does not function to change the aberration and thus does not produce effect on wave front of the light. If the liquid crystal element works for light on both approaching and returning routes as normal lenses do, the collimated light entering the liquid crystal element on the approaching route will be collimated again by the liquid crystal element on the returning route and emitted from it. However, since the liquid crystal element does not produce effect on returning light, the light is not emitted as collimated light. Furthermore, the degree of convergence and diffusion of light on the returning route vary depending on the degree of the spherical aberration correction.

On the returning route, light is totally reflected by the polarizing beam splitter 30 and enters the light-receiving element to obtain various signals. The extent to which the spherical aberration is corrected by the liquid crystal element varies the extent to which light is converged onto the light-receiving element. This changes a focus error signal which drives a focus servo, therefore the light spot will be defocused on the disk.

Focusing light on the disk is the major premise to record and reproduce data on the optical disk. Without the premise, it is difficult to detect spherical aberration.

The present invention was made to solve the above-mentioned previously known problems and has an object to provide a device capable of correcting spherical aberration that results from difference of individual disk without extra detecting components.

SUMMARY OF THE INVENTION

The present invention provides an optical disk device comprising an optical pick-up, a spherical aberration adjustment device, two detection devices, and a memory device. The optical pick-up is structured to irradiate light beams onto an optical disk through an objective lens, receive the light beams reflected from the optical disk by a two-divided light-receiving element, convert amounts of light received by each segment of the two-divided light-receiving element into electrical outputs, and detect differential signals between the electrical outputs. The spherical aberration adjustment device changes spherical aberration of light emitted from the objective lens of the optical pick-up. One of the detection devices detects an asymmetry property of deterioration degree of the differential signal detected when a light beam is defocused at any desired position on the radius of the optical disk with respect to the best-focus position where the differential signal is maximized. Another detection device detects control signals for the spherical aberration adjustment device. The memory device stores data constellation of the control signals corresponding to positions on the radius of the disk to minimize the asymmetry of the deterioration degree of the differential signals. The optical disk device performs recording and reproducing by controlling the spherical aberration adjustment device based on the data constellation of the control signals for the positions on the radius stored in the memory device.

The optical disk device is characterized in that the data constellation of the control signals to minimize the asymmetry of the deterioration degree of the differential signal detected at a plurality of representative positions is stored in the memory device, and a control signal for any desired position on the radius is obtained by substituting a value interpolated from the data constellation.

The optical disk device is characterized in that the data constellation of the control signals to minimize the asymmetry of the deterioration degree of the differential signal detected at a plurality of representative positions is stored in the memory device, and a control signal for any desired position is substituted by the control signal obtained at the representative position nearest the desired position.

The optical disk device is characterized in that the data constellation of the control signals to maximize symmetry of the deterioration degree of the differential signal detected at the representative positions is stored in the memory device, and a control signal for any desired position on the radius is obtained by approximate expression using the value of the representative position on the radius from the data constellation as a variable.

The optical disk device is characterized in that the spherical aberration adjustment device is comprised of a liquid crystal element for correcting spherical aberration.

The optical disk device is characterized in that the differential signal is a push-pull signal, and a focus position is determined by changing the control signal to be applied to the liquid crystal element for correcting spherical aberration, defocusing the light beam extensively, and obtaining the maximum value of the amplitude of the push-pull signal.

The optical disk device is characterized in that the amplitude of the push-pull signal when the beam is defocused so that a focus error signal is varied by same amounts is measured, and a control signal to be applied to the liquid crystal element for correcting spherical aberration to minimize the asymmetry of the amplitude deterioration is stored.

According to the above-mentioned structure, even if the spherical aberration adjustment device has an effect on only light on the approaching route, spherical aberration can be detected and corrected without extra detecting components.

As described above, according to the present invention, even if a spherical aberration correction element, which is effective on light on the approaching route but not light on the returning route, is used, the optical disk device with the above-mentioned structure can detect and correct spherical aberration without extra detecting components. Also the number of trial to narrower the optimal correction amount can be reduced. The present invention is applicable not just to disks with a guide groove, but to disks with bit array, that is, all disks in which differential signals are detected. Therefore the present invention can be used for a broad range of low-level formatted disk.

The foregoing and other objects, features, aspects and advantages of the present invention will become more apparent from the following detailed description of the present invention when reviewed in conjunction with the accompanying drawings;

DESCRIPTION OF PREFERRED EMBODIMENTS

By referring to FIG. 1 and FIG. 2, descriptions will be made on an optical disk device that detects and corrects spherical aberration according to the present invention.

Figure 1:
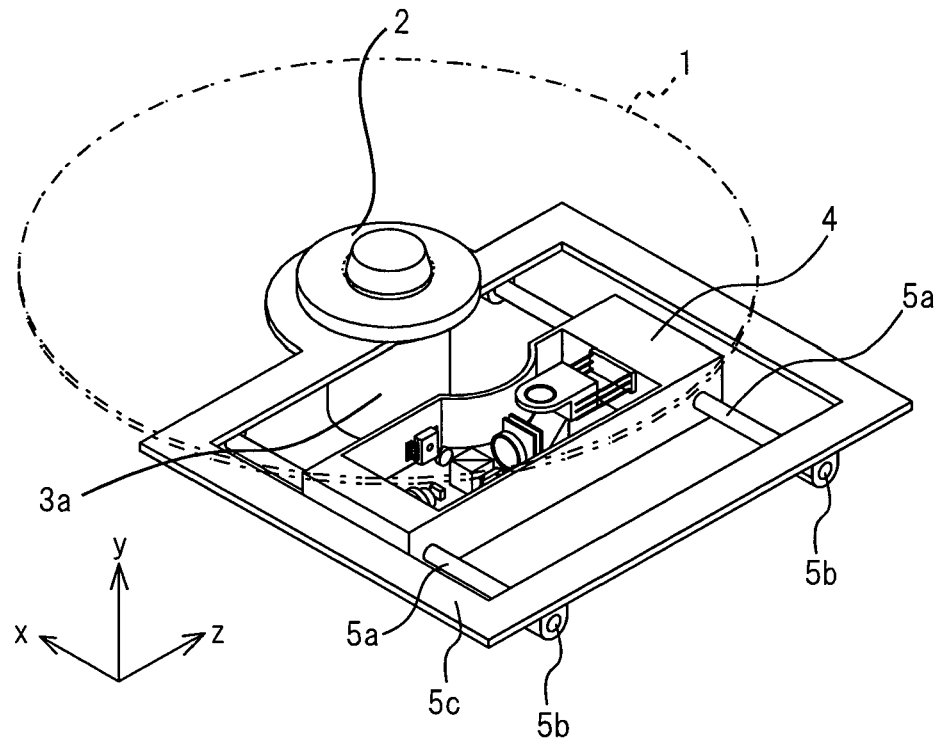
FIG. 1 is a perspective view illustrating a structure of an optical disk device according to the present invention.

As shown in FIG. 1, in the optical disk device according to an embodiment, an optical disk 1 or a signal recording/reproducing medium is held by a holder 2 and rotated by a spindle motor 3a. The optical disk 1 receives light irradiation from an optical pick-up 4; thereby signal is recorded onto or reproduced from the optical disk 1. The optical pick-up 4 is held by shafts 5a and can move in the axial direction of the shafts 5a. Each shaft 5a is held by a shaft holder 5b that is fixed to a shaft holder chassis 5c.

Figure 2:
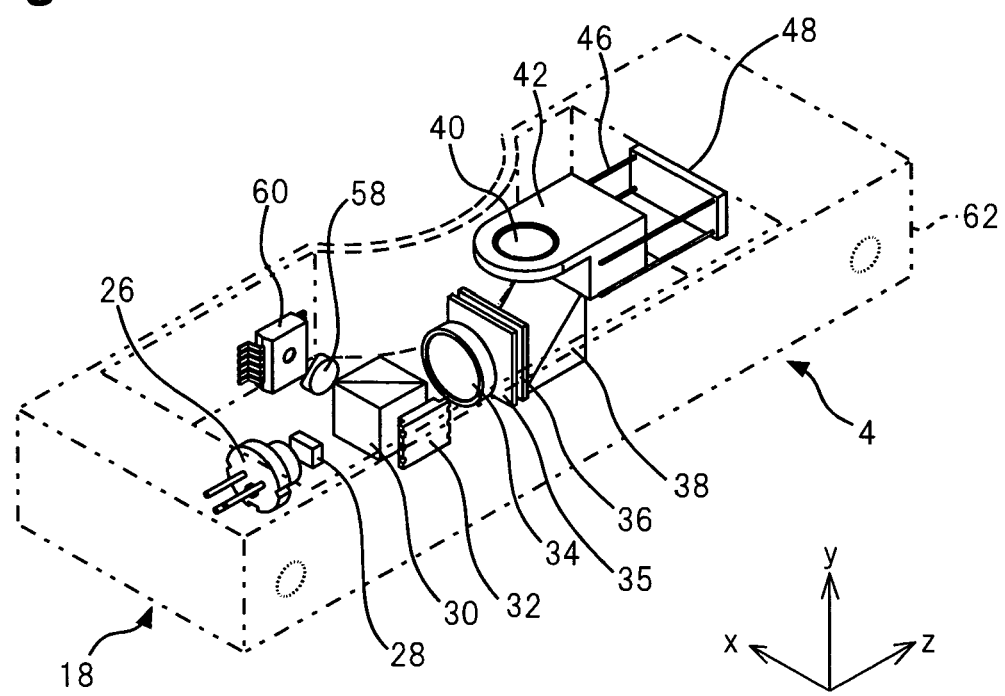
FIG. 2 is a perspective view illustrating a structure of a relevant part of the optical pick-up in the optical disk device according to the present invention.

As shown in FIG. 2, inside a housing 62 of the optical pick-up 4, provided is a laser diode 26 which is a light source for recording and reproducing signals. Light from the laser diode 26 is incident on a diffraction grating 28 that splits the incident light into three. The split three light beams enter a polarizing beam splitter 30, which reflects or transmits the light beams in accordance with polarization of the light. A front monitor 32 for detecting an amount of light is placed adjacent to a side surface of the polarizing beam splitter 30 or in front of the splitter 30 in FIG. 2. A collimator lens 34 for collimating the radiant light from the splitter is provided adjacent to one side of the splitter 30 opposite to the other side adjacent to the diffraction grating 28. The light transmitted through the collimator lens 34 passes through a liquid crystal correcting element for spherical aberration 35. This element has a function as described above. The light emitted from the element 35 is then applied to a quarter (¼) wavelength plate 36, which performs a conversion of circularly polarized light and linearly polarized light.

The light emitted from the quarter wavelength plate 36 is reflected by a reflection mirror 38, passes through an objective lens unit 40, and is focused on the optical disk 1. The objective lens unit 40 is held firmly by an objective lens holder 42 which is held by a wire suspension 46. A wire suspension plate 48 supports the wire suspension 46.

As can be appreciated from FIG. 2, a cylindrical lens 58 for producing astigmatism is provided adjacent to a rear surface of the polarizing beam splitter 30. A light-receiving sensor 60 receives the light from the cylindrical lens 58 and converts the light into electrical signals (current or voltage).

Figure 3:
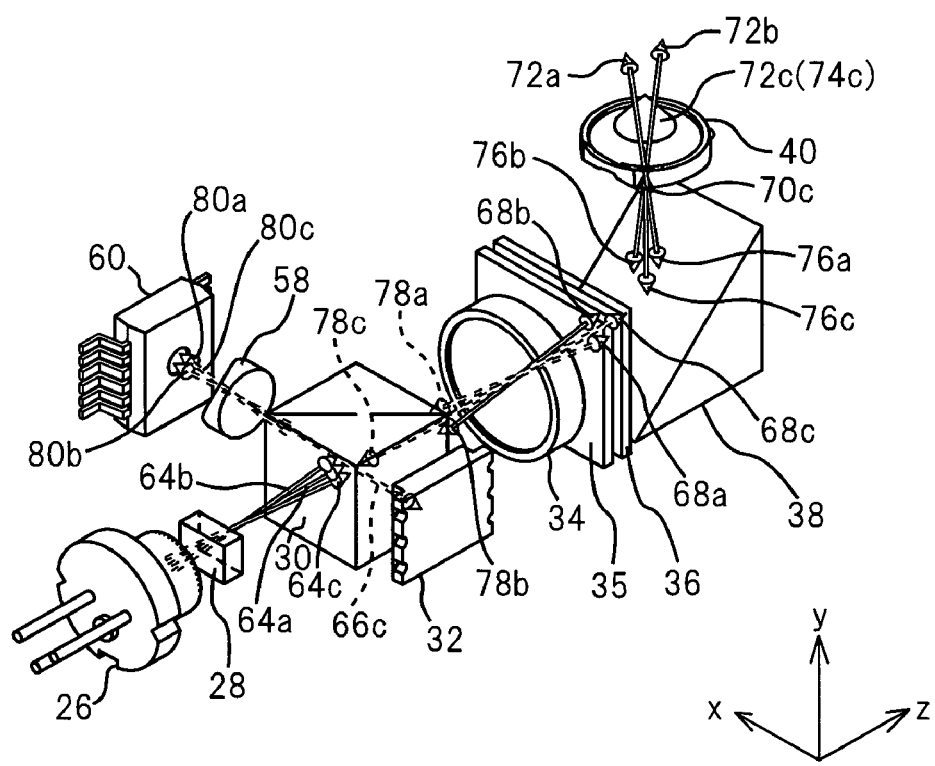
FIG. 3 is an explanatory diagram showing a relationship of beams in an optical system of the optical disk device according to the present invention.
Figure 4:
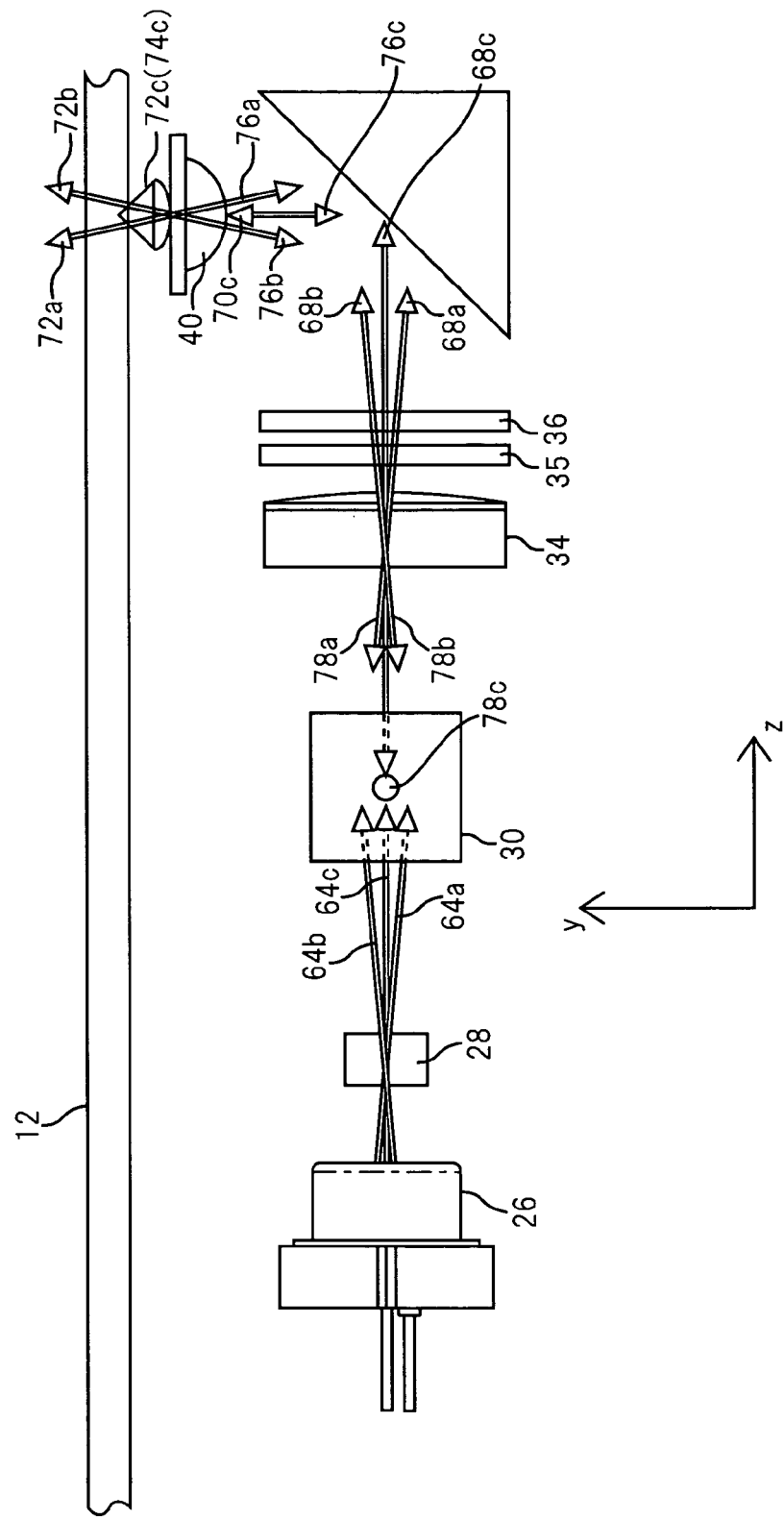
FIG. 4 is an explanatory diagram showing a relationship of beams in a y-z plane in the optical system of the optical disk device according to the present invention.
Figure 5:
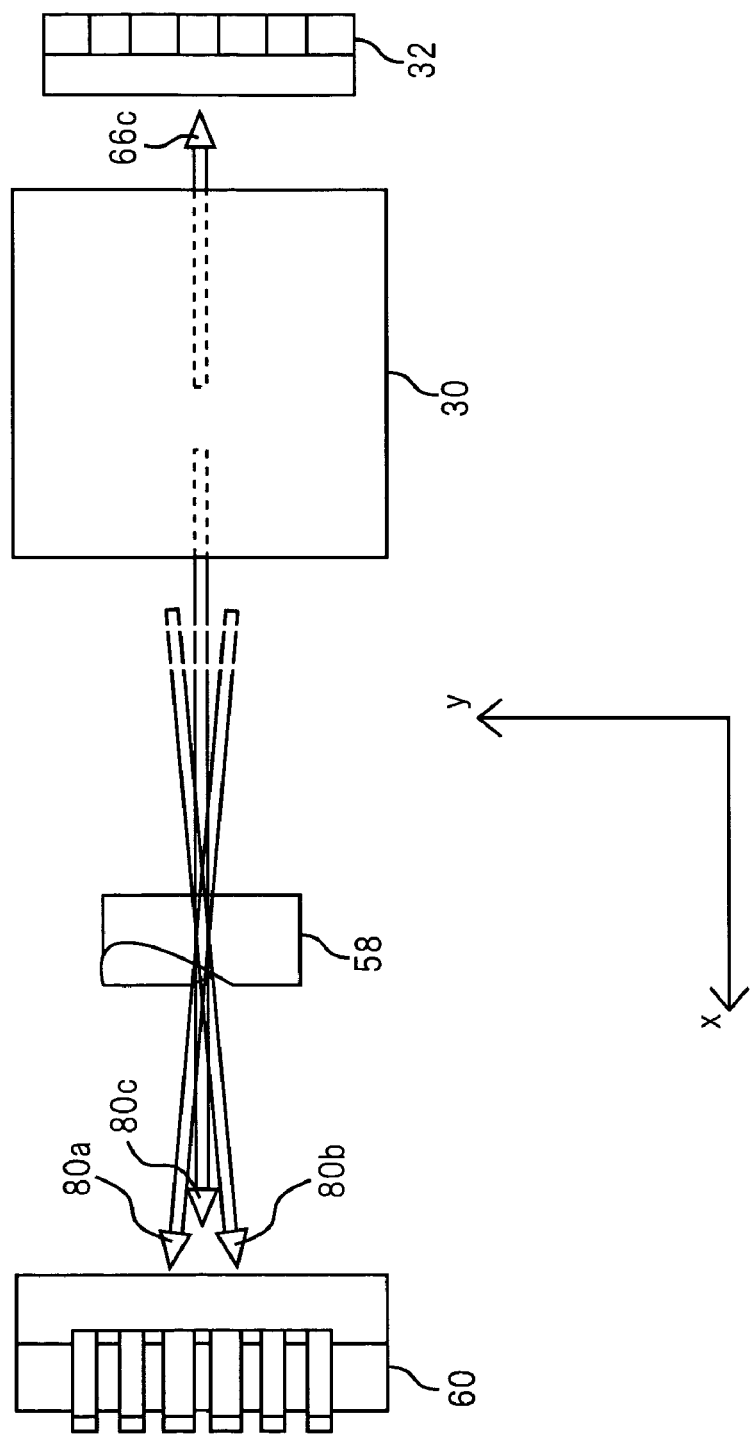
FIG. 5 is an explanatory diagram showing a relationship of beams in an x-y plane in the optical system in the optical disk device according to the present invention.

Now, by referring to FIG. 3 to FIG. 5, a flow of a light used for a normal signal reproduction will be described.

Light emitted radially from the laser diode 26 is a spherical wave. By passing through the diffraction grating 28, the light is divided into three lights 64a, 64b and 64c, or three spherical waves each of which has a virtual light source. The light 64c is a principal light beam of zeroth-order light using a light source of the laser diode 26 on the optical axis of the collimator lens 34. The light 64a and the light 64b are symmetrical with respect to the optical axis, and a +(plus) first-order light beam and a −(minus) first-order light beam respectively, each having a virtual light source within a y-z plane. The zeroth-order light is a main beam with a large amount of light and used for recording and reproducing signals, while the ± first-order lights are two sub-beams with a small amount of light and are used for a tracking servo referred to as a differential push-pull method.

Firstly, a flow of the zeroth-order light will be described. The polarizing beam splitter 30 splits a vertical (p-wave) component of the light into a spectrum of a transmitted light and reflected light at a predetermined ratio, for example 9:1, while splitting a horizontal (s-wave) component of the light into a spectrum of transmitted light and reflected light at a predetermined ratio, for example 0:10. In this optical system, since a plane of polarization of the linearly polarized light from the laser diode 26 is arranged to be parallel to the z-x plane, all lights emitted from the laser diode 26 are rendered vertical waves (p-waves). Therefore, one-tenth of the entire amount of light is reflected and enters the front monitor 32 as light 66c, and a remaining light 68c passes through the polarizing beam splitter 30.

The light 66c entering the front monitor 32 is converted into an electrical signal to be used for an automatic power control. For example, an electrical signal corresponding to the difference between an electrical signal corresponding to a target amount of light and an output of the front monitor 32 is applied to a controller. The controller controls current to be supplied to the laser diode 26 so that the electrical signal is kept at a predetermined value through a servo circuit that changes a value of the current to be supplied to the laser diode 26. Consequently, a main beam 70c emitted from the objective lens unit 40 is kept at a predetermined optical power.

The light 68c transmitted through the polarizing beam splitter 30 is converted by the collimator lens 34 from a spherical wave to a plane wave, in other words, from radiation light to collimated light. The direction is parallel to the optical axis.

The collimated light converted by the collimator lens 34 passes through a liquid crystal correcting element for spherical aberration 35. The functions of the element 35 have been already described above. The element 35 changes the spherical aberration of the light wave. If the incident light is collimated light, the light emitted from the element 35 is slightly diffused or converged. The light 68c then enters the quarter wavelength plate 36 that converts the linearly polarized light into circularly polarized light. The circularly polarized light means light in a state where phases of the p-wave and s-wave of the light are shifted by a one-fourth wavelength. Then, the light 68c changes its direction by the reflection mirror 38, and is incident into the objective lens unit 40 as light 70c. The light 70c is focused on the signal surface of a disk 12 (light 72c), and reflected (light 74c). If the light that is not corrected reaches a disk having improper thickness, the spherical aberration occurs. The incident light, however, is previously added by the correcting element 35 with same amount of the reverse spherical aberration as that of spherical aberration occurred on the disk; thereby these spherical aberrations offset each other on the disk.

The reflected light retraces an approaching route, is converted by the objective lens unit 40 into collimated light 76c, and passes through the quarter wavelength plate 36 (light 78c). At this time, since the phase of light is further shifted by a one-fourth wavelength in the quarter wavelength plate 36, the light is converted from circularly polarized light to linearly polarized light. However, contrarily to the light on the approaching route toward the disk, the plane of polarization of the light on the returning route from the disk is rendered parallel to the plane of s-wave with respect to the polarizing beam splitter 30, that is, rendered parallel to the y-z plane.

Next, the collimated light transmitted through the quarter wavelength plate 36 and the correction element for spherical aberration 35 is converted into a convergent light in the collimator lens 34, and enters the polarizing beam splitter 30 as light 78c. Since the light 78c is a linearly polarized s-wave, the light 78c is reflected 100% by the polarizing beam splitter 30. The reflected light 80c changes its direction toward the light-receiving sensor 60.

The plane of the linearly polarized light on the returning route is perpendicular to the correction element for spherical aberration 35; therefore, the liquid crystal element of the correction element for spherical aberration 35 does not work. Suppose that the liquid crystal element is effective on light on both the approaching route and the returning route, like lenses do, the collimated light on the approaching route may be converted by the liquid crystal element into diffused light, for example, while the converged light on the returning route may be converted into collimated light. However, since the liquid crystal element is not effective on the light on the returning route, the light passes straight through the liquid crystal element and emitted to the collimator lens 34 as converged light. The degree of convergence and diffusion varies in accordance with the degree of spherical aberration correction.

The light 80c heading for the light-receiving sensor 60 first enters the cylindrical lens 58. An edge line of the cylindrical lens 58 is tilted at an angle of 45 degrees toward the x-y plane while the optical axis is rendered as an x axial direction. Therefore, the focal position on the optical axis within this cross-section surface is not coincident with a focal position within a cross-section surface perpendicular to the cross-section. The reason why such astigmatism is produced is that an astigmatism method is used for the focus servo. Astigmatism is a phenomenon in which light emitted from a point is not converged to a point after passing through a lens. By the astigmatism method, such phenomenon is intentionally produced to detect focus errors.

The light 80c is converged on the optical axis near the light-receiving sensor 60 by the collimator lens 34 and the cylindrical lens 58. A reason that a term "converged" is used instead of "focused" is that since the light converged in the light-receiving sensor 60 by the astigmatism method has the astigmatic difference, it is not focused. The light-receiving sensor 60 is provided at an approximate intermediate position between the converged points of light from the two cross-section surfaces defined by the above-described cylindrical lens 58.

Figure 6:
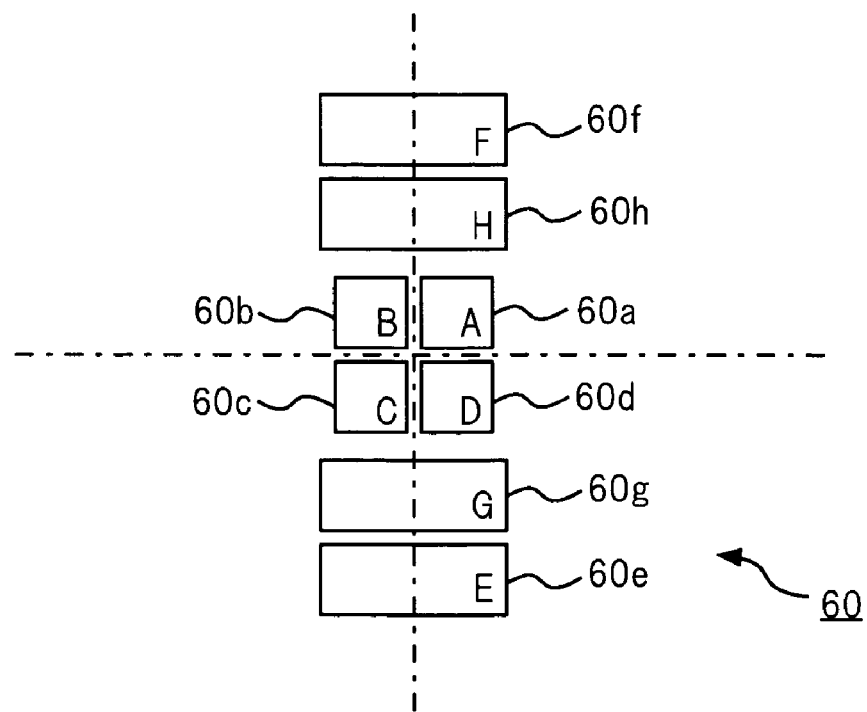
FIG. 6 is an explanatory diagram showing an arrangement of divided light-receiving sensors in the optical disk device according to the present invention.

The light 80c is converged onto four divided sensors 60a, 60b, 60c and 60d arranged on the optical axial position shown in FIG. 6. The light-receiving sensor 60 is divided into four parts so as to reproduce recorded signals, and at the same time, to be used for the focus servo. When the focal point of the objective lens is properly formed on the reflective surface of the disk, the shape of the beam spots on the four divided sensors 60a, 60b, 60c and 60d is rendered as a circle since the beam returns as a collimated light beam. When the objective lens is too close to the reflective surface of the disk, the shape of beam spots is rendered as an ellipse extending along the above-mentioned angle of 45 degrees since the beam is reflected as a divergent light beam and its focal point is shifted backward. In contrast to this, when the objective lens is too far away from the reflective surface, the shape of beam spots is rendered as an ellipse extending perpendicularly to the longitudinal direction of the previous ellipse since the beam is reflected as a convergent light beam and its focal point is shifted forward. Outputs from the sensors 60a and 60c of the four-divided sensor are applied to a + (positive) input terminal of an error amplifier while outputs from the sensors 60b and 60d of the four-divided sensors are applied to a − (negative) input terminal of the error amplifier, for example. When light is focused on the reflective surface of the disk, outputs from the four sensors 60a to 60d are equal, therefore the focus error signal represents zero. When the optical disk is too close to or too far away from the objective lens, the outputs from each sensor are different from each other, therefore outputs from the error amplifier change between positive and negative. Error voltage from the error amplifier is applied to a driving circuit for a focus coil to move the objective lens so that the error voltage approaches zero. When a positive error voltage, which means the objective lens is too close to the disk, is applied to the driving circuit for the focus coil, the objective lens is moved away from the disk, conversely, moving the objective lens toward the disk when a negative error voltage is applied. In this manner, the objective lens unit 40 is driven so that the error voltage always approaches zero.

Push-pull method using a main beam will be now described. If the beam 76c is off track either rightward or leftward, the intensity distribution of the reflected light is asymmetrical due to diffraction phenomena. When the beam 76c is perfectly on track, the intensity distribution of the reflected light is symmetrical. The push-pull method is to detect tracking errors using a main beam. In the push-pull method, a two-divided photodiode having a dividing line which is parallel with the direction in which pits moves is provided to detect the tracking error from the balance of the light amounts of a main beam. Herein, the sensors 60a and 60b of the four-divided sensor are used as one photodiode, while the sensors 60c and 60d are used as another photodiode. When the beam is on track, the shadow of a pit is cast evenly on the both photodiodes; therefore the output from a differential amplifier for detecting errors represents zero. When the beam is off track rightward or leftward, the light amount received on the left photodiode and the light amount received on the right photodiode increase or decrease relatively to each other; therefore the differential amplifier outputs a + (positive) output voltage or a − (negative) output voltage as tracking error signals. The dividing direction of the photodiode is well known and its explanation is omitted.

Since the degree of spherical aberration correction varies the degree of parallelism, i.e. the degree of diffusion or convergence of the light incident into the collimator lens, the focal position of the light traveling toward the light-receiving element is shifted with respect to the optical axis direction. Accordingly, even though the beam is focused properly on the disk, the focus error signal cannot be zero. If the focus servo starts working in such a situation, the beam will be defocused on the disk. As a result, the push-pull signal decreases in amplitude while the tracking servo is not working.

Although the ± first-order lights are used for a tracking servo called a differential push-pull method, it is substantially irrelevant to the present invention and also is a well-known technique. Its explanation is omitted.

Next description is about spherical aberration. Deterioration of a spot on a signal surface of the optical disk 1 with a thick cover layer will be described and followed by a method of compensating for the influence of the cover layer by moving a lens for correcting the aberration.

Figure 8:
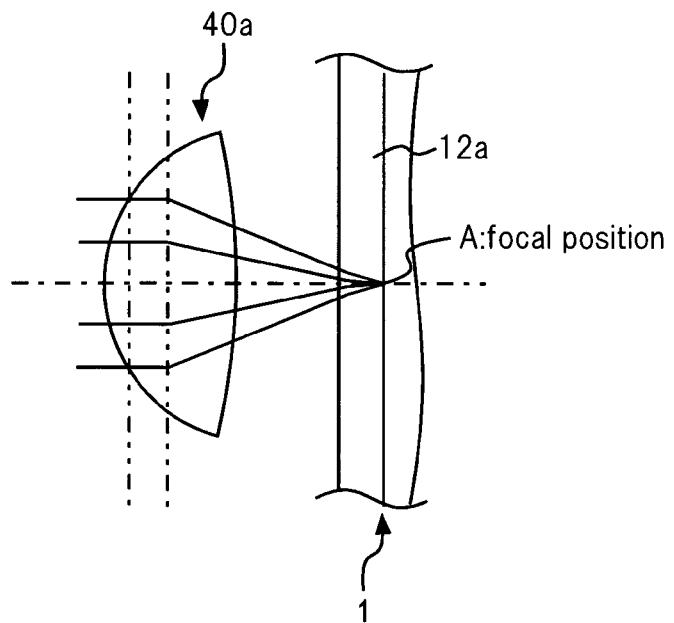
FIG. 8 is a schematic view showing a state of light ray when using a disk with a proper thickness cover layer that does not generate spherical aberration.

Firstly, we will see a spot when the cover layer of the disk 1 is thick. FIG. 8 shows a state of light rays when the thickness of the cover layer 12a of the disk 1 is proper and spherical aberration is not produced. As shown in FIG. 8, the focus spot A is formed at a predetermined position.

Figure 9:
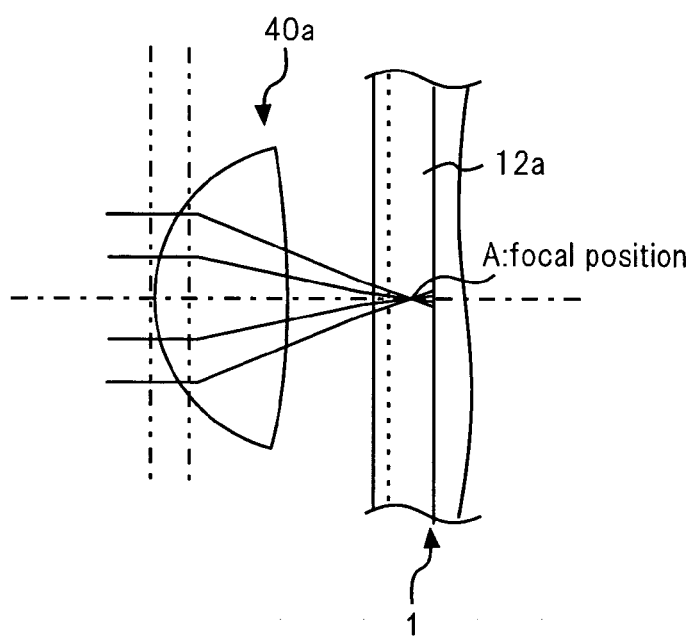
FIG. 9 is a schematic view showing a state of light ray when using a disk with a thicker cover layer.

FIG. 9 shows a state of light rays when the thickness of the cover layer 12a of the disk 1 is thicker than the proper thickness. As shown in FIG. 9, the focus spot A is formed before the predetermined position in this example, but the light is focused on a position near the signal surface of the disk 1 because the objective lens unit 40 is moved closer to the disk 1 by the focus servo. However, the focal point of paraxial light is not coincident with the focal point of ambient light; therefore the spot becomes larger.

Figure 10:
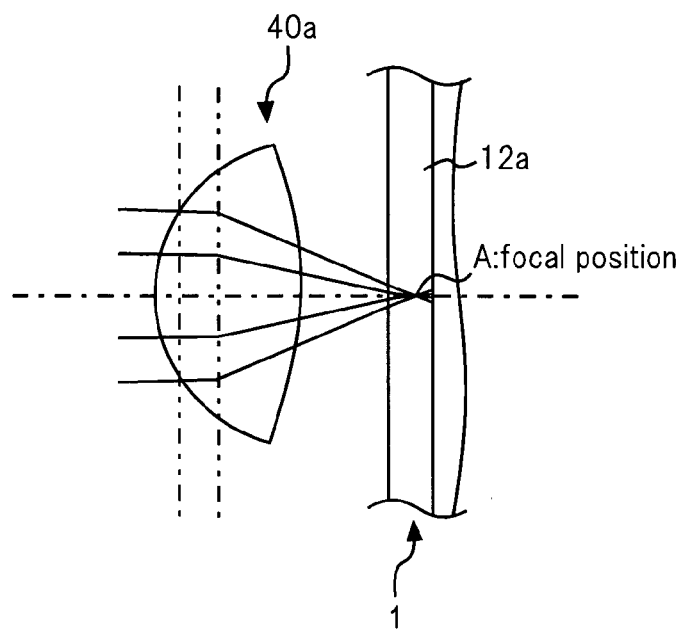
FIG. 10 is a schematic view showing a state of light ray when spherical aberration occurs.

Subsequently, we will see a spot when the correction element for spherical aberration 35 is working. FIG. 10 shows a state of light rays when spherical aberration is produced since the light incident into a first objective lens 40a is not collimated. In this case, the focus spot A is formed at a position different from the predetermined position. In the example shown in FIG. 10, the focus spot A is formed before the predetermined position. Even so, if the focus servo works properly, the objective lens unit 40 is moved closer to the disk 1 and the light beam is focused at a position near the signal surface of the disk 1. However, the focal point of paraxial light is not coincident with the focal point of ambient light; therefore the spot becomes bigger.

Figure 11:
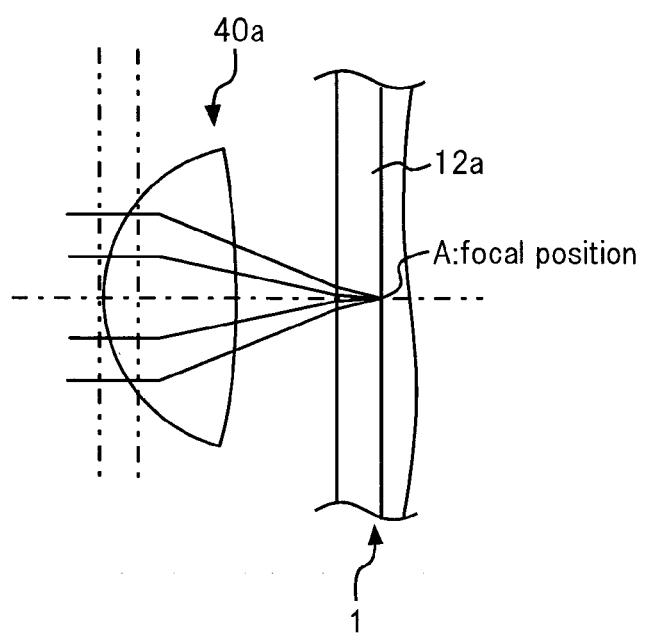
FIG. 11 is a schematic view showing a state of light ray when the spherical aberration is corrected.
Figure 12:
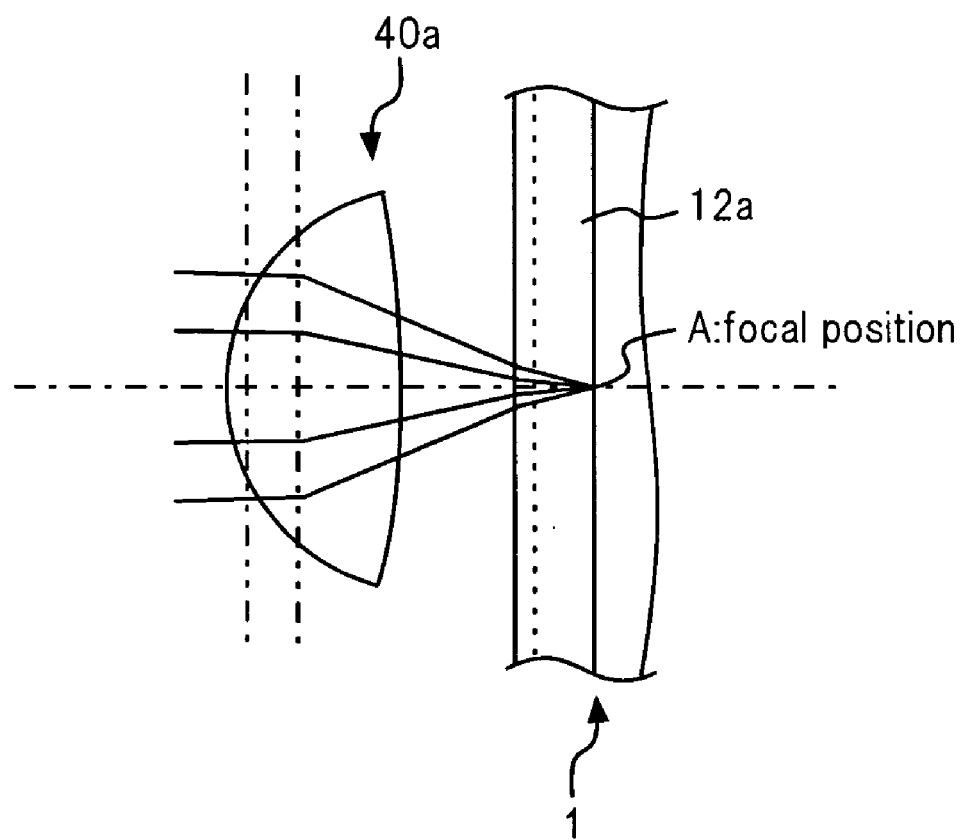
FIG. 12 is a schematic view showing a state of light ray when a disk with a thicker cover layer is used and spherical aberration is compensated.

In order to compensate for the spherical aberration caused by the thickness variation of the cover layer 12a of the disk as shown in FIG. 9, the spherical aberration is corrected in the reverse direction to the direction shown in FIG. 10. Consequently, as shown in FIG. 11, the spherical aberration caused by the thickness variation of the cover layer 12a can be compensated; thereby the focal point of paraxial light is coincident with the focal point of ambient light.

Figure 7:
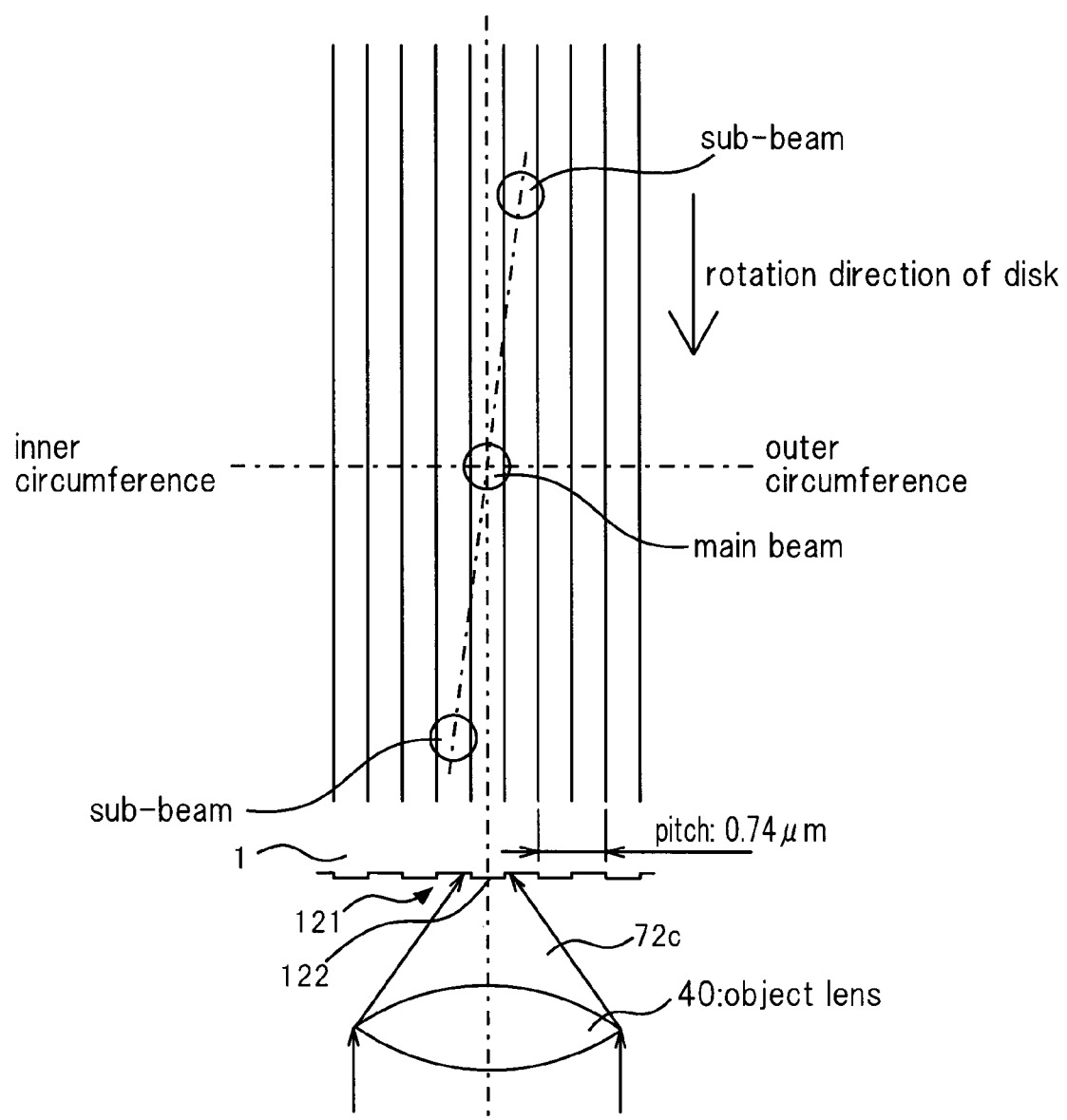
FIG. 7 is an explanatory diagram showing a state where beam spots are formed on grooves of a disk where a record is made.

FIG. 7 shows a state where light 72c (see FIG. 3 and FIG. 4) is irradiated and focused on a groove 122 of the disk 1 where record is made. On the optical disk 1 irradiated are a main beam and two sub-beams. The reflected light from the optical disk 1 is converged on the four-divided light-receiving sensors 60a to 60d as above mentioned. The differential signal between an electrical output from the sensors (A+B) and an electrical output from the sensors (C+D) shown in FIG. 6 is referred to as a push-pull signal. When the spots of the light 72c are on a center of the groove 122 and adjacent lands 121 as shown in FIG. 7, the push-pull signal is zero. When the spots are off the center, the imbalance of the light intensity distribution becomes greatest and the push-pull signal takes maximum value or minimum value; therefore the push-pull signal varies like a sine wave with respect to the moving distance of the spot.

The other kinds of push-pull signal including combinations of sensors and dividing directions of the sensor are well-known techniques and not directly relevant to the present invention. Its explanation is omitted.

Figure 14:
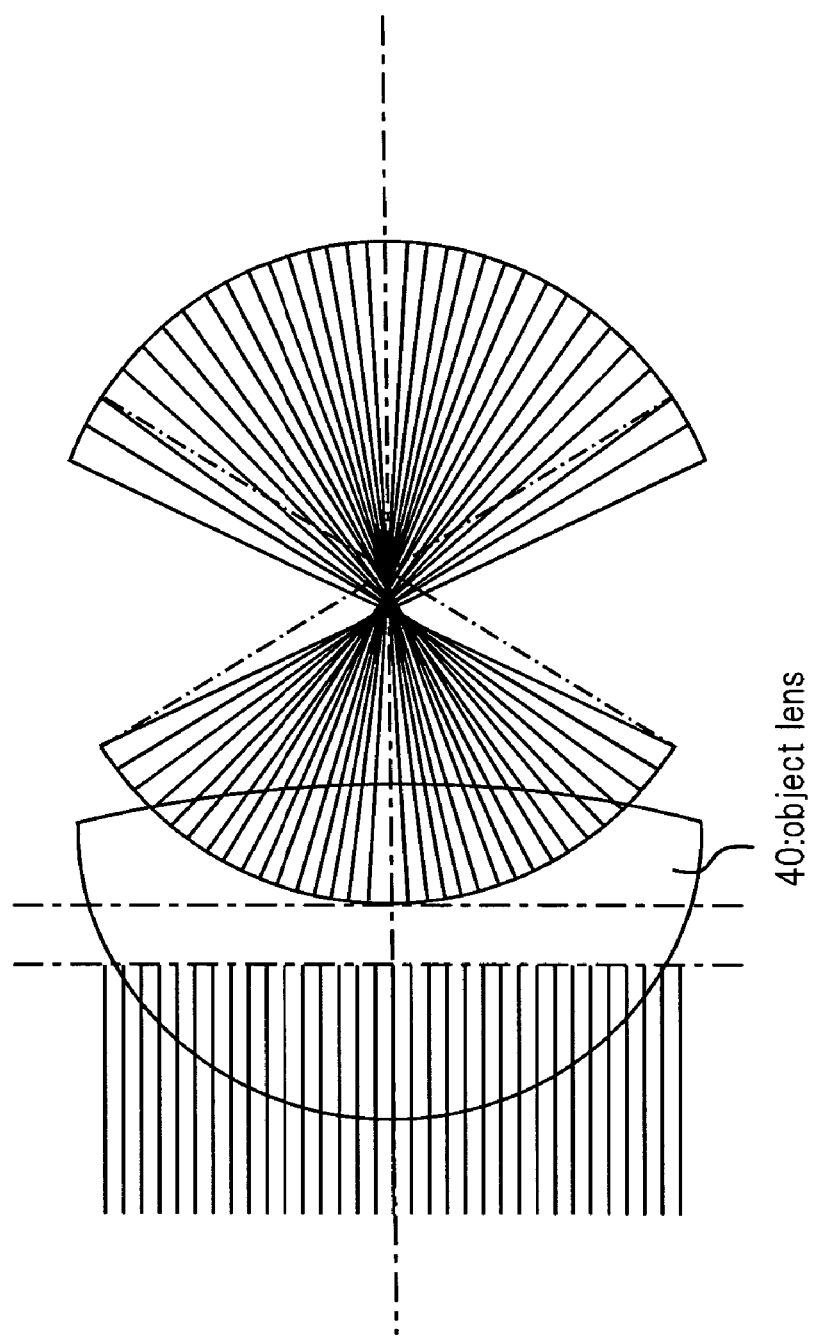
FIG. 14 is a schematic view showing the spherical aberration with trails of the light ray.

The principle of spherical aberration detection is herein described by referring to FIG. 7 and FIG. 14. As described above, FIG. 7 shows the cross-section of the disk when the disk is cut in the radial direction and a plane of the disk in a state where grooves is irradiated by a beam from underneath. Amplitude of the push-pull signal, which is obtained when spherical aberration occurs and a defocused beam crosses a groove, is smaller than amplitude of the push-pull signal, which is obtained when spherical aberration does not occur and a focused beam crosses the groove.

FIG. 14 is a diagram showing spherical aberration in the form of the trajectory of light rays. For simplicity, the cover layer is omitted in FIG. 14. Suppose that the envelop curve of the light rays, or the caustic corresponds to a spot size, as shown in FIG. 14, with respect to a focal position on the optical axis in which a circle of confusion becomes minimum, the spots before and after the focal position are asymmetric in size. Accordingly, when the beam is defocused, the push-pull signals before and after the focal position are asymmetric in amplitude with respect to a focal position in which the beam spot is smallest on the optical axis. It is considered that when the amplitudes are symmetric, there is no spherical aberration, and when the asymmetry of the amplitudes is least, there is the least spherical aberration.

Therefore, the diameter of the spot formed on the optical disk 1 is varied by superimposing or compensating for the spherical aberration caused by changes in the divergence of incident light toward the first objective lens 40 and the spherical aberration caused by thickness variation of the cover layer 12a. In this situation, a comparison is made between amplitudes of the push-pull signals obtained from spots defocused by same amount before and after a focal position where the push-pull signal amplitude becomes greatest. The state where deterioration degree of the amplitudes becomes equivalent the most is the state where the spot has the best quality and the spherical aberration is corrected.

Actually, an input signal capable of minimizing the asymmetry can be obtained for every position on the radius of the disk, and the obtained input signal is applied to a spherical aberration adjustment device (the correction element for correcting spherical aberration 35 in this embodiment).

Figure 15:
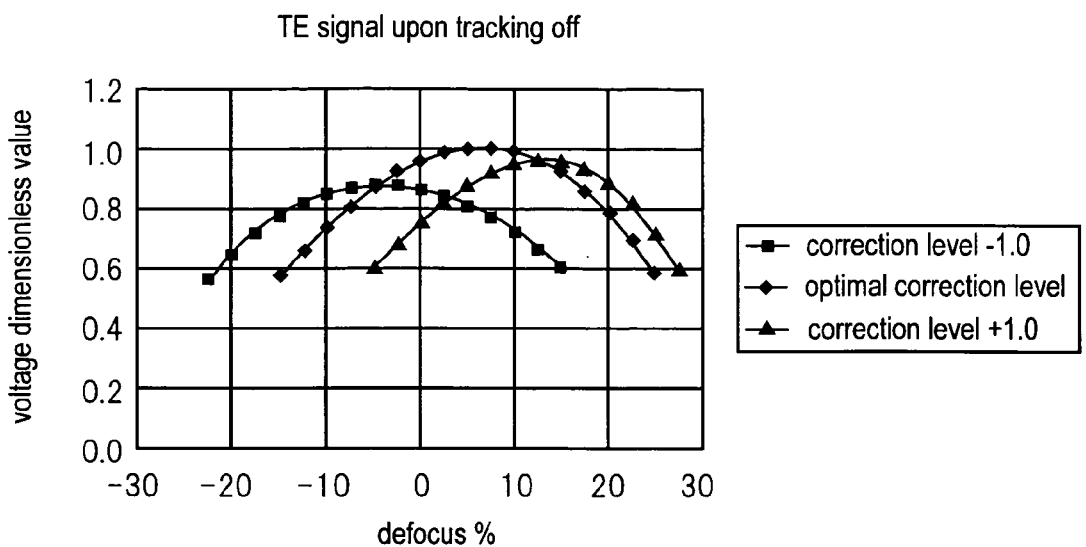
FIG. 15 is a schematic view showing defocus characteristics against the push-pull amplitude values when the spherical aberration is optimally corrected and when the correction value is offset by equal amount in two directions opposite to each other.
Figure 16:
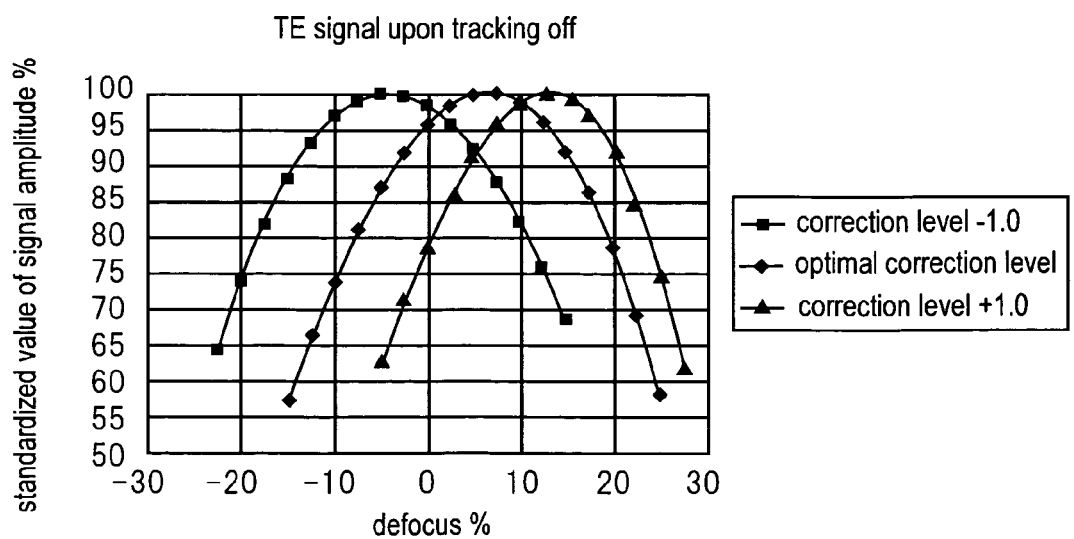
FIG. 16 is a schematic view showing the curves normalized with reference to their own maximum value in order to clarify the symmetry property of the curves with respect to the X-axis which is taken at the maximum value of the curve.
Figure 17:
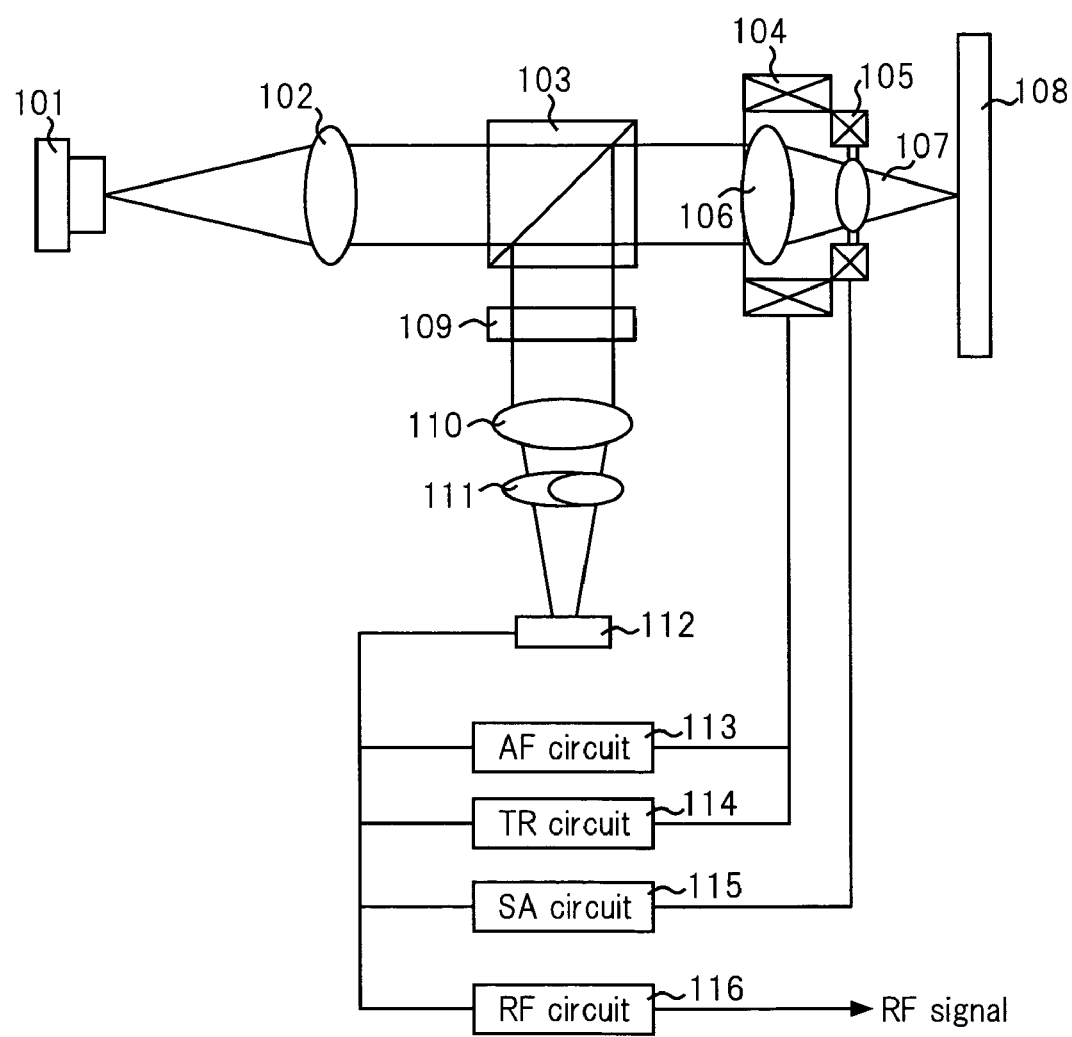
FIG. 17 is a block diagram showing a basic structure of a conventional optical disk device capable of correcting spherical aberration.

FIG. 15 is a diagram showing defocusing characteristics against push pull amplitude of light when spherical aberration is optimally corrected and when the correction value is offset by equal amount in two directions opposite to each other. In FIG. 16, an X-axis is taken at the maximum value of the curve and the curves are then normalized with reference to their own maximum value in order to clarify the symmetry property of the curves with respect to the X-axis. When the offset value is added to the optimal correction value for the spherical aberration, the curves become asymmetric opposite to each other.

By the way, if there is a difference between an amount of spherical aberration correction obtained in the present invention and an amount of correction to optimize the beam spot obtained in the course of actual recording, the difference can be corrected in advance. Also with the method according to the present invention, it is possible to previously bring an amount of correction near to the optimal amount of correction and to further narrow the amount of correction to be optimal during a try of writing; thereby reducing the number of the try and time.

The specific method will be described. A pick-up 4 moves in the radius direction of the disk between the innermost circumference and outermost circumference, and detects the influence caused by the thickness variation of the cover layer 12a at regular intervals. The focus servo works so as to focus the light beam to form a beam spot on the optical disk 1. Here the tracking servo is not allowed to work. Accordingly the beam spot traverses the grooves or the track of pits without following them since the optical disk is eccentric.

The input signal to be applied to the spherical aberration adjustment device (correction element for spherical aberration 35) is varied at regular intervals. The amplitude of the push-pull signal obtained when the input signal is varied is measured to detect its asymmetry.

Subsequently, pairs of data, consisted of position data on the radius and the input signal to be applied to the spherical aberration adjustment device so that the asymmetry of the push-pull signal is least, are obtained and then stored in a storage unit. During recording and reproducing, the input signal to be applied to the spherical aberration adjustment device is controlled based on the pair data to compensate the spherical aberration caused by the thickness deviation of the cover layer on a basis of the pair data.

The input signal of the spherical aberration adjustment device is, for example, a voltage applied to the liquid crystal correction element for spherical aberration 35.

As described above, when recording or reproducing a signal at any desired position on the radius of the disk, the input signal for the spherical aberration adjustment device is determined to minimize the asymmetry of the push-pull signal least at the desired position from the pair data. Alternately, the input signal to minimize the asymmetry is determined from another pair of the data obtained near the desired position as a substitute.

When recording or reproducing of signal is performed at any position on the radius, the input signal is set so that the asymmetry is minimized at the position and applied to the spherical aberration adjustment device.

Actually, various structures of the liquid crystal element for correcting spherical aberration has been reported as existing techniques, but it is not important for the present invention to adopt one particular structure. A structure which acts on light on both approaching and returning routes, such as a beam expander using two lenses may be used as the spherical aberration adjustment device.

Figure 13:
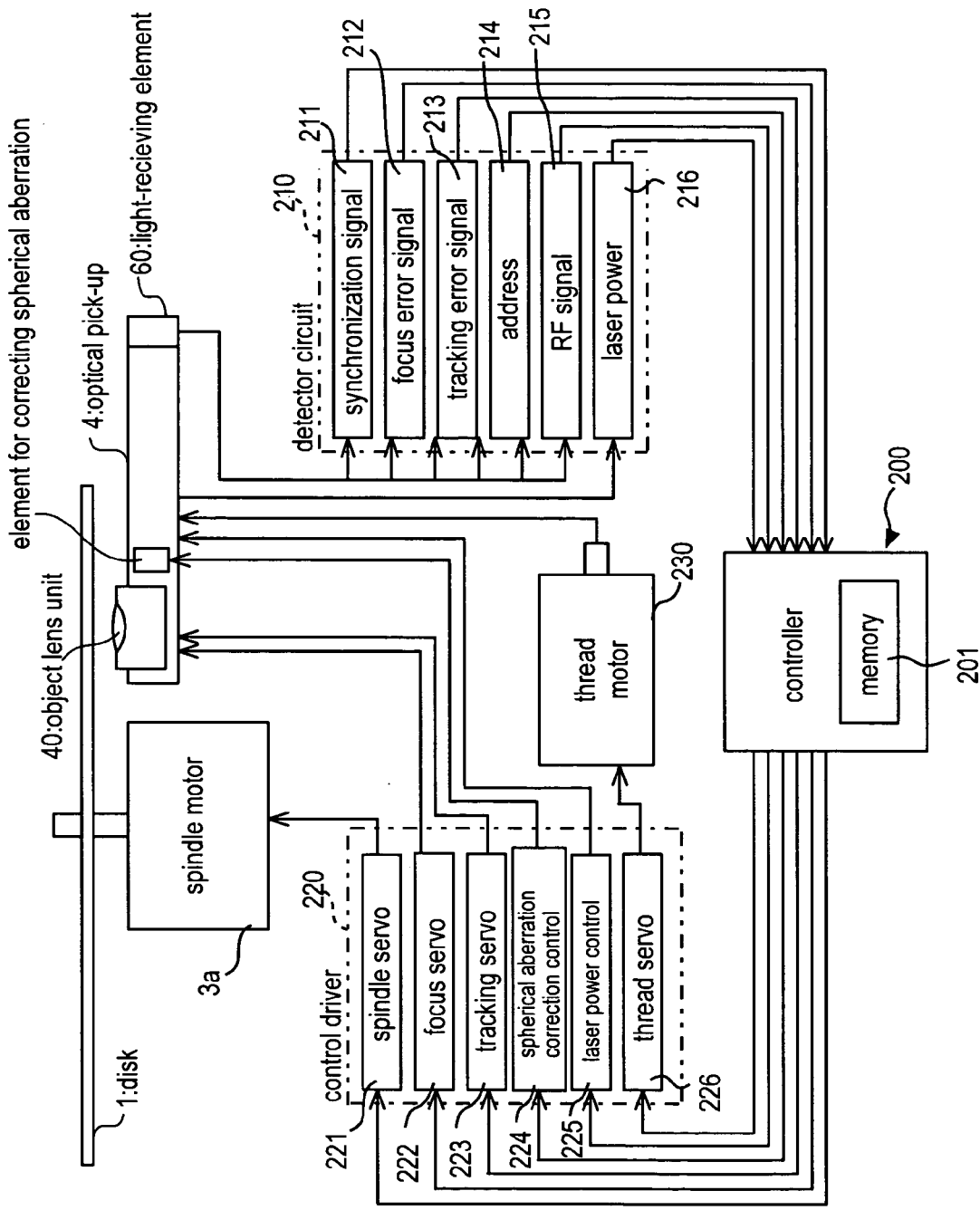
FIG. 13 is a block diagram showing a basic embodiment of the optical disk device capable of correcting aberration according to the present invention.

Next, a structure of an optical disk device using the above-described spherical aberration correction method is shown in FIG. 13. FIG. 13 is a block diagram showing a basic embodiment of an optical disk device capable of correcting spherical aberration.

The light-receiving element 60, serving as a photodetector, has a plurality of light-receiving regions, each detecting light, converting the detected light into a photo-electric current and supplying the current to a detector circuit 210. In the detector circuit 210, a synchronization signal detector circuit 211, a focus error signal detector circuit 212, a tracking error signal detector (TR) circuit 213, an address detector circuit 214, and a reproduced signal detector (RF) circuit 215 output a voltage signal respectively. Light incident to the front monitor is converted into an electric signal by a laser power detector circuit 216.

The detected signals from each circuit in the detector circuit 210 are applied to a controller 200 comprised of a microprocessor and so on. The controller 200 controls a control driver 220 in accordance with the signals from the detector circuit 210.

The control driver 220 comprises a spindle servo circuit 221 for controlling a spindle motor 3a, a focus servo circuit 222 for controlling focus errors, a tracking servo circuit 223 for controlling the tracking error, a control circuit for correcting spherical aberration 224 for controlling actuators for spherical aberration, a laser power control circuit 225 for controlling laser power and a thread motor control circuit 226 for controlling the a thread motor.

The spindle servo circuit 221 controls a spindle motor 3a under instructions from the controller 200 based on the synchronization signal so that the spindle motor 3a spins at a constant linear velocity.

The controller 200 feeds the focus servo circuit 222 with a driving signal to move the bidirectional actuator in the focusing direction based on the focus error signal so as to always form an optimal light spot on the optical disk. The controller 200 feeds the track servo circuit 223 with a driving signal to move the bidirectional actuator radially based on the tracking error signal so as to exercise a tracking control. The control circuit for correcting spherical aberration 224 is controlled so as to compensate spherical aberrations caused by the thickness variation of the cover layer of the optical disk. In the reproduced signal detector circuit, a series of processes for reproducing signals recorded on the optical disk is performed, including current-voltage conversion, waveform equalization and binarization. The laser power control circuit 225 is fed by the controller 200 with an electric signal corresponding to the difference between an electric signal corresponding to a target light amount and output from the front monitor, and changes the value of the electric current to be supplied for laser light based on the fed electric signal. The thread motor control circuit 226 controls the thread motor 230 under the instruction from the controller 200 so as to place the optical pick-up 4 at a predetermined address location.

In the above-mentioned optical disk device, the controller 200 controls the thread motor control circuit 226 to regulate the radial movement of the pick-up 4 between the innermost circumference and outermost circumference of the optical disk 1 to detect the influence caused by the thickness variation of the cover layer 12a at regular intervals. The focus servo circuit 222 is controlled to operate the focus servo so that a beam spot is focused on the optical disk 1. Here, the tracking servo circuit 223 is not allowed to work. Accordingly the beam spot traverses the grooves or the track of pits without following them since the optical disk is eccentric.

In this embodiment, the input signal for the spherical aberration adjustment device (correction element for spherical aberration 35) is varied at regular intervals. The amplitude of a push-pull signal is measured after a light beam is defocused extensively. Focusing position then is determined by requiring the greatest value of the amplitude. Furthermore, the beam is defocused so that the focus error signal is changed by same amounts, and then the amplitude of the push-pull signal is measured. Consequently, an input signal to be applied to the correction element for spherical aberration 35 to minimize the asymmetry of the amplitude deterioration is determined The input signal for the spherical aberration adjustment device to make the asymmetry of amplitude deterioration least at the position on the radius is stored in memory 201 in the controller 200.

One after another, input signals for the spherical aberration adjustment device to minimize the asymmetry at every position on the radius are stored in the memory 201 in the controller 200 by moving the optical pick-up 4 in the radial direction of the optical disk 1. Thus, the memory 201 stores the value of the input signals for the spherical aberration adjustment device to minimize the asymmetry corresponding to each position on the radius as a table.

When recording or reproducing of signals at any position on the radius is performed, the input signal for the spherical aberration adjustment device to minimize the asymmetry at the position is obtained from the table which is previously stored in the memory 201. The controller 200 controls the control circuit for correcting spherical aberration 224 to control the input signal to be applied to the correction element of spherical aberration during recording and reproduction.

In this way, spherical aberration caused by the thickness variation of the cover layer 12a is compensated; thereby preferable recording and reproduction can be performed.

Alternatively, the input signals for the spherical aberration adjustment device to make the asymmetry least are obtained at some representative positions on the radius and stored to the memory 201 in the above-described embodiment. Input signals obtained at any other positions on the radius can be interpolated from the data constellation, or can be substituted by the representative input signal obtained at the representative position nearest the desired position.

When the value of an input signal at desired position on the radius is determined by this method, the necessity of accessing the data constellation in the memory may retard the recording rate and reproducing rate.

The effective method to solve the problem is to obtain optimal input signals for entire area of the radius by an approximate expression. It is conceivable that the thickness variation of the cover layer 12a of the optical disk 1 may be continuously changed. Accordingly it is conceivable that the amount of the spherical aberration caused by the thickness variation may be continuously changed, further the input signal for correcting the spherical aberration may be continuously changed. The approximate amount of the spherical aberration can be obtained by nth expression, such as quadratic expression and cubic expression, using the value of the position on the radius as a variable.

For example, the quadratic expression requiring three coefficients needs three data constellations at least to obtain the coefficients. If the cubic expression is used, at least four data constellations are needed because the third order formula requires four coefficients. These obtained coefficients are stored in a register so as to use for calculation any time. Such a few coefficients in number place fewer burdens to determine the input signal.

When an input signal at a position on the radius is required, the value of the position on the radius may be substituted into the approximate expression. Since an access to the memory is not needed to obtain the input signal, a sequence for recording and reproduction does not delay. Another advantage is not only to shorten time to obtain the data in advance, but also to take small space of the memory, since the data amount can be reduced greatly.

Although the present invention has been described and illustrated in detail, it should be clearly understood that the description discloses examples of different embodiments of the invention and is not intended to be limited to the examples or illustrations provided. Any changes or modifications within the spirit and scope of the present invention are intended to be included, the invention being limited only by the terms of the appended claims.

What is claimed is:

1. An optical disk device, comprising:
    an optical pick-up being structured to irradiate light beams onto an optical disk through an objective lens, receive the light beams reflected from the optical disk by a two-divided light-receiving element, convert amounts of light received by each segment of the two-divided light-receiving element into electrical outputs, and detect differential signals between the electrical outputs;
a spherical aberration adjustment device for changing spherical aberration of light emitted from the objective lens of the optical pick-up;
a detection device for detecting asymmetry of deterioration degree of the differential signal detected when a light beam is defocused at any desired position on the radius of the optical disk with respect to the best-focus position where the differential signal is maximized;
a detection device for detecting control signals for the spherical aberration adjustment device; and
a memory device for storing data constellation of the control signals corresponding to positions on the radius of the disk to minimize the asymmetry of the deterioration degree of the differential signals, wherein
the optical disk device performs recording and reproducing by controlling the spherical aberration adjustment device based on the data constellation of the control signals for the positions on the radius stored in the memory device.

2. The optical disk device of claim 1, wherein the data constellation of the control signals to minimize the asymmetry of the deterioration degree of the differential signal detected at a plurality of representative positions is on the radius stored in the memory device, and a control signal for any desired position on the radius is obtained by substituting a value interpolated from the data constellation.

3. The optical disk device of claim 1, wherein the data constellation of the control signals to minimize the asymmetry of the deterioration degree of the differential signal detected at a plurality of representative positions on the radius is stored in the memory device, and a control signal for any desired position is substituted by the control signal obtained at the representative position nearest the desired position.

4. The optical disk device of claim 1, wherein the data constellation of the control signals to maximize symmetry of the deterioration degree of the differential signal detected at the representative positions on the radius is stored in the memory device, and a control signal for any desired position on the radius is obtained by approximate expression using the value of the representative position on the radius from the data constellation as a variable.

5. The optical disk device of claim 1, wherein the spherical aberration adjustment device is comprised of a liquid crystal element for correcting spherical aberration.

6. The optical disk device of claim 5, wherein the differential signal is a push-pull signal, and a focus position is determined by changing the control signal to be applied to the liquid crystal element for correcting spherical aberration, defocusing the light beam extensively, and obtaining the maximum value of the amplitude of the push-pull signal.

7. The optical disk device of claim 6, wherein the amplitude of the push-pull signal obtained when the light beam is defocused so as to change a focus error signal by same amounts is measured, and the control signal to be applied to the liquid crystal element for correcting spherical aberration to minimize the asymmetry of the amplitude deterioration is stored.

* * * * *